US011888248B2

(12) United States Patent
Cheng

(10) Patent No.: US 11,888,248 B2
(45) Date of Patent: Jan. 30, 2024

(54) INTERMEDIATE ELECTRICAL CONNECTOR, ELECTRICAL CONNECTOR ASSEMBLY, AND ELECTRICAL CONNECTOR ASSEMBLY EQUIPPED WITH A CIRCUIT BOARD

(71) Applicant: Hirose Electric Co., Ltd., Kanagawa (JP)

(72) Inventor: Xingyu Cheng, Kanagawa (JP)

(73) Assignee: Hirose Electric Co., Ltd., Kanagawa (JP)

( * ) Notice: Subject to any disclaimer, the term of this patent is extended or adjusted under 35 U.S.C. 154(b) by 0 days.

(21) Appl. No.: 17/178,106

(22) Filed: Feb. 17, 2021

(65) Prior Publication Data

US 2021/0257759 A1 Aug. 19, 2021

(30) Foreign Application Priority Data

Feb. 18, 2020 (JP) ................................. 2020-025415

(51) Int. Cl.
*H01R 12/70* (2011.01)
*H01R 31/06* (2006.01)
(Continued)

(52) U.S. Cl.
CPC ....... *H01R 12/7082* (2013.01); *H01R 12/716* (2013.01); *H01R 12/73* (2013.01);
(Continued)

(58) Field of Classification Search
CPC .. H01R 12/7082; H01R 12/716; H01R 12/73; H01R 13/508; H01R 13/6273;
(Continued)

(56) References Cited

U.S. PATENT DOCUMENTS 7,108,567 B1 9/2006 Korsunsky et al.
8,360,789 B2 1/2013 Leo et al.
10,297,966 B1 * 5/2019 Hamner ............... H01R 13/518

FOREIGN PATENT DOCUMENTS

CN 100576657 C 12/2009
CN 109921248 A 6/2019
(Continued)

*Primary Examiner* — Abdullah A Riyami
*Assistant Examiner* — Justin M Kratt
(74) *Attorney, Agent, or Firm* — Procopio, Cory, Hargreaves & Savitch LLP

(57) ABSTRACT

An intermediate electrical connector 1 which, upon connection of a first counterpart connect body 2 and a second counterpart connect body each from different sides in a manner permitting plugging and unplugging, mediates between the two counterpart connect bodies, the intermediate electrical connector 1 comprising terminals that are enabled to contact, respectively, the first counterpart connect body 2 and the second counterpart connect body, and a housing that directly or indirectly secures the terminals in place, wherein the connector has locking fittings 100 supported by the housing of the intermediate electrical connector 1, and the locking fittings 100 have locking portions 104A enabled to engage lockable portions 151 provided in the first counterpart connect body 2 in the direction of disengagement when the intermediate electrical connector 1 and said first counterpart connect body 2 are connected.

12 Claims, 7 Drawing Sheets

(51) Int. Cl.

| | |
|---|---|
| ***H01R 13/627*** | (2006.01) |
| ***H01R 13/508*** | (2006.01) |
| ***H01R 12/71*** | (2011.01) |
| ***H01R 12/73*** | (2011.01) |
| *H01R 12/57* | (2011.01) |
| *H01R 13/6586* | (2011.01) |
| *H01R 13/11* | (2006.01) |
| *H01R 13/639* | (2006.01) |
| *H01R 13/502* | (2006.01) |

(52) U.S. Cl.

CPC ....... *H01R 13/508* (2013.01); *H01R 13/6273* (2013.01); *H01R 31/06* (2013.01); *H01R 12/57* (2013.01); *H01R 12/70* (2013.01); *H01R 13/11* (2013.01); *H01R 13/502* (2013.01); *H01R 13/639* (2013.01); *H01R 13/6586* (2013.01)

(58) Field of Classification Search

CPC ........ H01R 31/06; H01R 12/57; H01R 12/70; H01R 13/11; H01R 13/639; H01R 13/6586; H01R 13/502

See application file for complete search history.

(56) References Cited

FOREIGN PATENT DOCUMENTS

| | | | |
|---|---|---|---|
| CN | 209561823 | U | 10/2019 |
| JP | H6-62605 | U | 9/1994 |
| JP | H11-74024 | | 3/1999 |
| JP | 2008-251311 | A | 10/2008 |
| JP | 2014-222648 | A | 11/2014 |
| JP | 2018-037336 | A | 3/2018 |
| JP | 2019-102229 | A | 6/2019 |
| TW | 201318281 | A | 5/2013 |

* cited by examiner

INTERMEDIATE ELECTRICAL CONNECTOR, ELECTRICAL CONNECTOR ASSEMBLY, AND ELECTRICAL CONNECTOR ASSEMBLY EQUIPPED WITH A CIRCUIT BOARD

CROSS-REFERENCE TO RELATED APPLICATIONS

This application claims priority to Japanese Patent Application No. 2020-025415, filed Feb. 18, 2020, the contents of which are incorporated herein by reference in its entirety for all purposes.

BACKGROUND

Technical Field

This invention relates to an intermediate electrical connector which, upon connection of two counterpart connect bodies, mediates between the two counterpart connect bodies, an electrical connector assembly having said intermediate electrical connector and one counterpart connect body, and an electrical connector equipped with a circuit board obtained by mounting the counterpart connect body of said electrical connector assembly to a circuit board.

Related Art

Such an intermediate electrical connector, electrical connector assembly, and electrical connector assembly equipped with a circuit board have been disclosed, for example, in Patent Document 1. In Patent Document 1, a first counterpart connector (counterpart connector 3) mounted to a circuit board, and a second counterpart connector (counterpart connector 2) mounted to another circuit board are adapted to be matingly connected to the intermediate electrical connector from sides opposite each other in the up-down direction. Specifically, during a connector mating operation, the first counterpart connector mounted to a circuit board is first matingly connected to the intermediate electrical connector from above, and then the second counterpart connector mounted to another circuit board is subsequently matingly connected to the intermediate electrical connector.

The intermediate electrical connector is formed by coupling multiple connecting units arranged in a direction parallel to the circuit board using coupling members made of sheet metal. In addition, each connecting unit is formed by securing blades intended for contact with the first and second counterpart connectors in place in two housing halves (bottom housing half 80 and top housing half 90) split in the up-down direction.

In Patent Document 1, raised engaging portions (illustrated in FIG. 5(A) and FIG. 6(A-C) of Patent Document 1 without assigning reference numerals) are formed on the lower interior wall surface of the bottom housing half made of an electrically insulating material, and when the intermediate electrical connector is matingly connected to the first counterpart connector, the engaging portions of the intermediate electrical connector engage engageable portions (not shown) provided in the housing of the first counterpart connector made of an electrically insulating material, thereby preventing inadvertent decoupling of the two connectors.

PATENT DOCUMENTS

[Patent Document 1]
Japanese Published Patent Application No. 2019-102229.

SUMMARY

Problems to be Solved

Although in Patent Document 1 the direction in which the connectors are mated is the up-down direction, depending on the situation in which the operation of connecting and mating the connectors is performed, the direction of mating is actually not limited to the up-down direction, and the action of connecting and mating may be performed while the connectors in an oblique orientation with respect to the up-down direction. For example, if, as described in Patent Document 1, the direction of mating is the up-down direction during an operation whereby, upon matingly connecting an intermediate electrical connector to a first counterpart connector mounted to a circuit board in Patent Document 1, the intermediate electrical connector is matingly connected to a second counterpart connector mounted to another circuit board, then the section where the intermediate electrical connector is mated with the other counterpart connector is obscured by the other circuit board, which makes visual observation difficult.

It is believed that when, for example, an operator holds one circuit board with one hand while also holding the other circuit board with their other hand in order to facilitate visual observation of the mating section, the mating operation is performed while holding both connectors in an oblique orientation with respect to the up-down direction. At such time, the decoupling of the two connectors is prevented through engagement of engaging portions in the intermediate electrical connector and engageable portions in the first counterpart connector.

However, since the engaging portions, which are part of the bottom housing half of the intermediate electrical connector, as well as the engageable portions, which are part of the housing of the first counterpart connector, are both formed of an electrically insulating material and, in addition, are shaped such as to not interfere with the plugging and unplugging of the two connectors, ensuring a sufficiently large force of engagement between the engaging portions and the engageable portions is not necessarily an easy task. Therefore if, for example, the dimensions of the intermediate electrical connector in the up-down direction are large and said intermediate electrical connector itself is heavy, said intermediate electrical connector may decouple from the first counterpart connector under its own weight when it is held in an oblique orientation with respect to the up-down direction.

In view of the aforesaid circumstances, it is an object of the present invention to provide an intermediate electrical connector, an electrical connector assembly, and an electrical connector assembly equipped with a circuit board capable of adequately preventing inadvertent decoupling of an intermediate electrical connector and a counterpart connect body.

Technical Solution

It is an object to provide an intermediate electrical connector, an electrical connector assembly, and an electrical connector assembly equipped with a circuit board capable of adequately preventing inadvertent decoupling of an intermediate electrical connector and a counterpart connect body.

According to this invention, the above-described problem is eliminated by using the following intermediate electrical connector according to a first invention, electrical connector assembly according to a second invention, and electrical connector assembly equipped with a circuit board according to a third invention.

The intermediate electrical connector according to the first invention is an intermediate electrical connector which, upon connection of a first counterpart connect body and a second counterpart connect body each from different sides in a manner permitting plugging and unplugging, mediates between the two counterpart connect bodies, and comprises terminals that are enabled to contact, respectively, the first counterpart connect body and the second counterpart connect body, and a housing that directly or indirectly secures the terminals in place.

Such an intermediate electrical connector, in the present invention, is characterized by having locking fittings supported by the housing of the intermediate electrical connector, and by the fact that the locking fittings have locking portions enabled to engage lockable portions provided in said first counterpart connect body in the direction of disengagement when the intermediate electrical connector and the first counterpart connect body are connected.

In the present invention, the locking fittings are provided in the intermediate electrical connector and the locking portions of the locking fittings are enabled to engage the lockable portions provided in the first counterpart connect body in the direction of disengagement when the intermediate electrical connector and the first counterpart connect body are connected. In the present invention, the strength of the locking portions themselves is increased compared to when such locking portions are formed in a conventional housing of an electrically insulating material, and adequate force of engagement between the locking portions and the lockable portions, i.e., locking strength, is ensured because the locking portions are formed as part of the locking fittings, which are metallic members. Therefore, the intermediate electrical connector and the first counterpart connect body are unlikely to disengage even if the intermediate electrical connector and the first counterpart connect body are held in an oblique orientation with respect to the up-down direction while being connected to each other.

In the first invention, the locking fittings have plate-shaped sections extending in the direction of plugging into and unplugging from the first counterpart connect body, the locking portions are formed as cantilevered resiliently displaceable locking pieces that are obtained by cutting out and raising a portion of the plate-shaped sections so as to extend in the direction of disengagement from the first counterpart connect body, and the locking pieces may be adapted to permit engagement with the lockable portions of the first counterpart connect body. In this manner, forming the locking portions as locking pieces makes it possible to bring the locking portions and the lockable portions into engagement in a more reliable manner.

In the first invention, the housing may be adapted to have engaging portions enabled to engage the engageable portions provided in the first counterpart connect body in the direction of disengagement when the intermediate electrical connector and said first counterpart connect body are connected. In this manner, inadvertent decoupling of the intermediate electrical connector and the first counterpart connect body can be reliably prevented by providing engaging portions in the housing and making engagement with the first counterpart connect body possible not only using the locking portions, but also using the engaging portions.

In the first invention, the housing has two housing halves split in the direction of connection to the first connect body, the locking fittings extend in the direction of connection within a range spanning the two housing halves and are supported by said two housing halves, and the two housing halves may be adapted to be enabled for relative movement within a predetermined range in a direction perpendicular to the direction of connection. With such an arrangement, due to the fact that the locking fittings allow relative movement of the two housing halves in a direction perpendicular to the direction of connection, even if relative positions of the first connect body and the second connect body are offset in the same direction, the two housing halves move relative to each other in exact proportion to this offset, thereby enabling connection of the two connect bodies through the medium of the intermediate electrical connector.

In the first invention, the intermediate electrical connector comprises multiple connecting units having the terminals and the housings, the multiple connecting units are arranged such that the array direction is a direction perpendicular to the direction of connection to the first connect body, and the locking fittings may be adapted to extend throughout the array range of the multiple connecting units in the array direction and collectively couple said multiple connecting units.

The electrical connector assembly according to the second invention is characterized by comprising the intermediate electrical connector according to the first invention and the first counterpart connect body.

In the second invention, the first counterpart connect body is a counterpart connector that is matingly connected to the intermediate electrical connector and may have lockable fittings that have formed therein lockable portions enabled to engage the locking portions of the intermediate electrical connector upon connection to said intermediate electrical connector.

With such an arrangement, forming the lockable portions as part of the lockable fittings, which are metallic members, increases the strength of the lockable portions themselves. Accordingly, the force of engagement between the locking portions and the lockable portions—and, therefore, the locking strength—is increased due to the fact that the locking portions of the locking fittings of the intermediate electrical connector and the lockable portions of the lockable fittings of the counterpart connector can be engaged when the intermediate electrical connector and the counterpart connector are connected.

The third invention is characterized by comprising the electrical connector assembly according to the second invention and a circuit board, and by the fact that the first counterpart connect body of the electrical connector assembly is an electrical connector for circuit boards that is mounted to the circuit board and is matingly connectable to the intermediate electrical connector.

Technical Effect

In the present invention, as described above, the strength of the locking portions of the intermediate electrical connector is increased and adequate force of engagement between the locking portions and the lockable portions of the counterpart connect body, i.e., locking strength, is ensured because the locking portions themselves are formed as part of the locking fittings, which are metallic members. As a result, even if the intermediate electrical connector and the counterpart connect body are held in an oblique orientation with respect to the up-down direction while being connected to each other, their decoupling is adequately prevented.

BRIEF DESCRIPTION OF DRAWINGS

FIGS. 4(A) and 4(B) illustrate cross-sectional views of one intermediate connecting unit and two counterpart connecting units to be connected thereto from above and from below, wherein FIG. 4(A) shows a state prior to mating, and FIG. 4(B) shows a state in which the first counterpart connector is matingly connected to the intermediate electrical connector.

FIGS. 5(A) and 5(B) illustrate view illustrating a coupling member in isolation, wherein FIG. 5(A) is a front view, and FIG. 5(B) is a side view.

FIGS. 6(A) and 6(B) illustrate perspective cross-sectional views illustrating the locked sections of the locking portions of the intermediate electrical connector and the lockable portions of the first counterpart connector on an enlarged scale, wherein FIG. 6(A) shows the connectors in a regular mated state, and FIG. 6(B) shows a state in which the intermediate electrical connector has been lifted up.

FIGS. 7(A) and 7(B) illustrate cross-sectional views illustrating the operation of unlocking of the locking portions of the intermediate electrical connector and the lockable portions of the first counterpart connector, wherein FIG. 7(A) shows a state immediately before unlocking, and FIG. 7(B) shows a state immediately after unlocking.

DETAILED DESCRIPTION

Embodiments of the present invention are described below with reference to the accompanying drawings.

Figure 1:
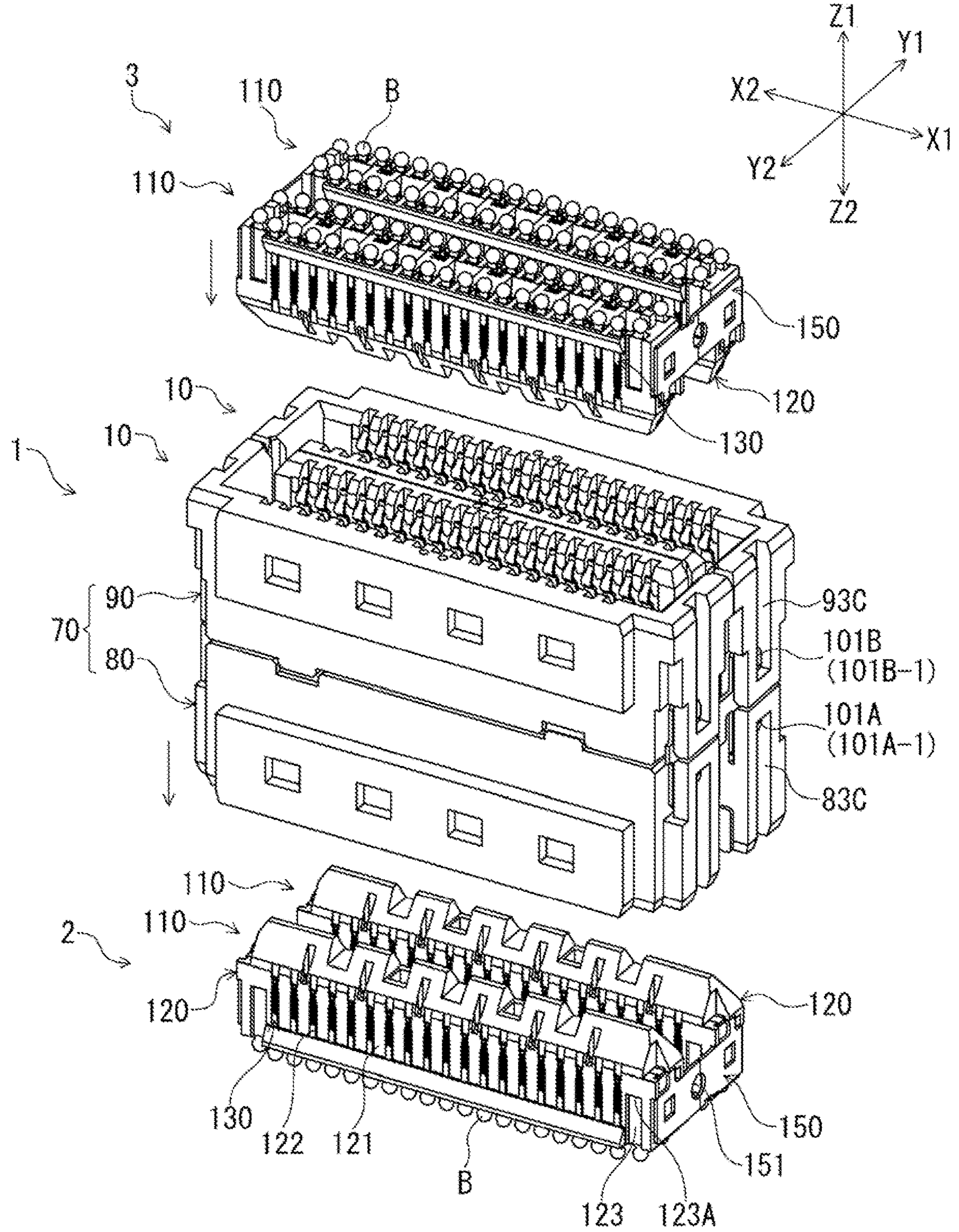
FIG. 1 illustrates a perspective view of an intermediate electrical connector according to an embodiment of the present invention and two counterpart connectors to be connected thereto from above and from below, illustrating a state prior to mating.
Figure 2:
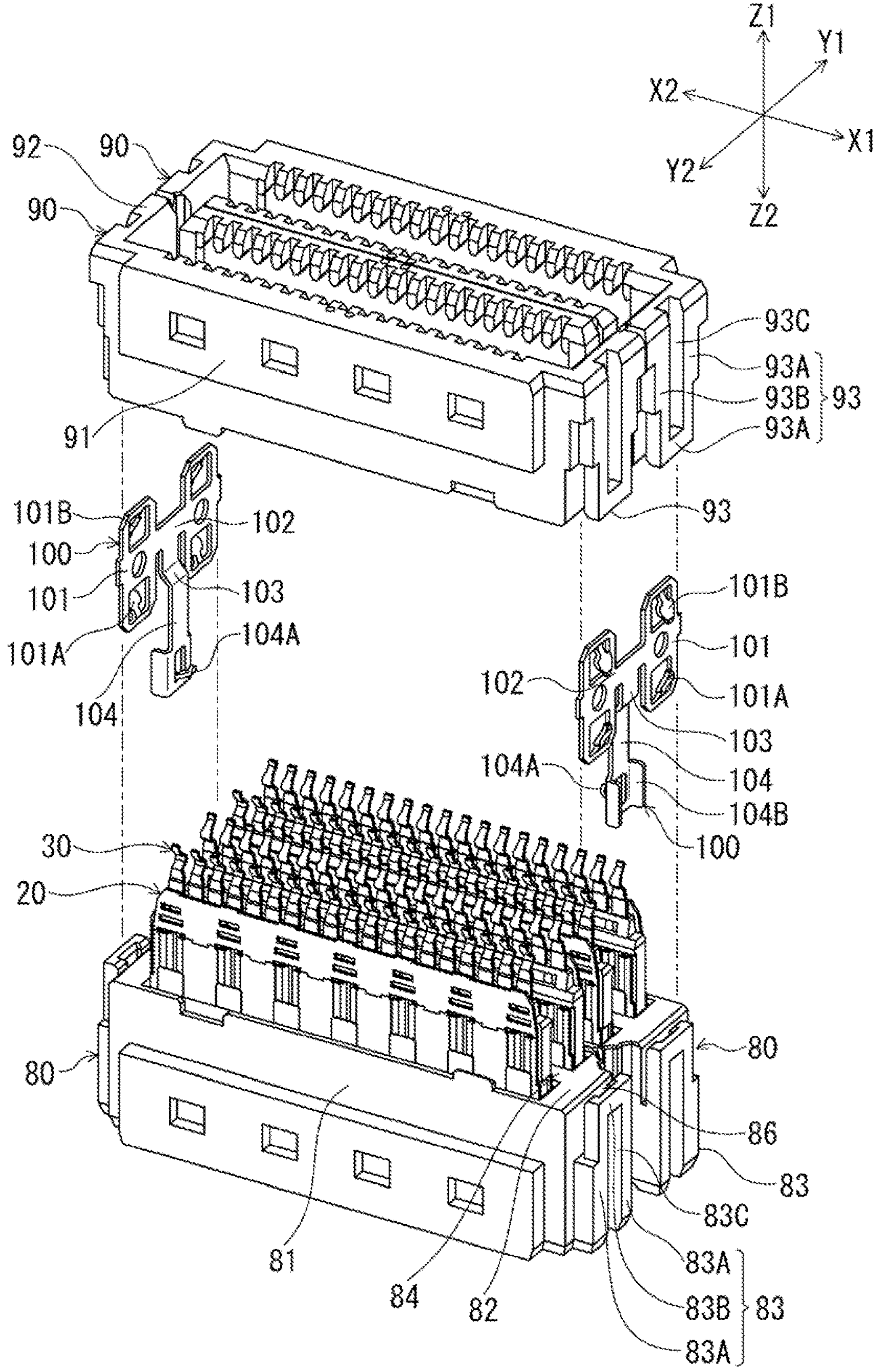
FIG. 2 illustrates a perspective view illustrating the components of the intermediate electrical connector of FIG. 1 in a separated state.

FIG. 1 is a perspective view of an intermediate electrical connector according to an embodiment of the present invention and two counterpart connectors to be connected thereto from above and from below, illustrating a state prior to mating. In addition, FIG. 2 is a perspective view illustrating the components of the intermediate electrical connector of FIG. 1 in a separated state. In the intermediate electrical connector 1 according to the present embodiment (referred to simply as "intermediate connector 1" below), which provides an intermediary connection between the two counterpart connectors, the direction of connection of the connectors is the up-down direction (Z-axis direction), the first counterpart connector 2 serving as the first counterpart connect body is connected from below (side Z2), and the second counterpart connector 3 serving as the second counterpart connect body is connected from above (side Z1). The first counterpart connector 2 and the second counterpart connector 3 (referred to as "counterpart connectors 2, 3" whenever necessary for ease of discussion) are each identical in shape. The counterpart connectors 2, 3 are electrical connectors for circuit boards respectively connected to different circuit boards P1, P2 (see FIGS. 4(A) and 4(B)).

In the present embodiment, the counterpart connectors 2, 3 have two counterpart connecting units 110 arranged in a direction (Y-axis direction) parallel to the mounting faces of the corresponding circuit boards. Thus, the number of the counterpart connecting units 110 of the first counterpart connector 2 and the number of the counterpart connecting units 110 of the second counterpart connector 3 are equal. The two counterpart connecting units 110 of the first counterpart connector 2 are mounted to a single circuit board P1 (see FIGS. 4(A) and 4(B)), and the two counterpart connecting units 110 of the second counterpart connector 3 are mounted to a single circuit board P2 (see FIGS. 4(A) and 4(B)).

The intermediate connector 1 has the same number of the intermediate connecting units 10 as the counterpart connecting units 110, in other words, two, and the counterpart connecting units 110 of the first counterpart connector 2 and the connecting units 110 of the second counterpart connector 3 are adapted to be connected through the medium of the intermediate connecting units 10.

The intermediate connector 1 illustrated in FIG. 1 has two intermediate connecting units 10 and two coupling members 100 made of sheet metal that collectively couple the two intermediate connecting units 10 arranged in the Y-axis direction (see FIG. 2).

Figure 4A:
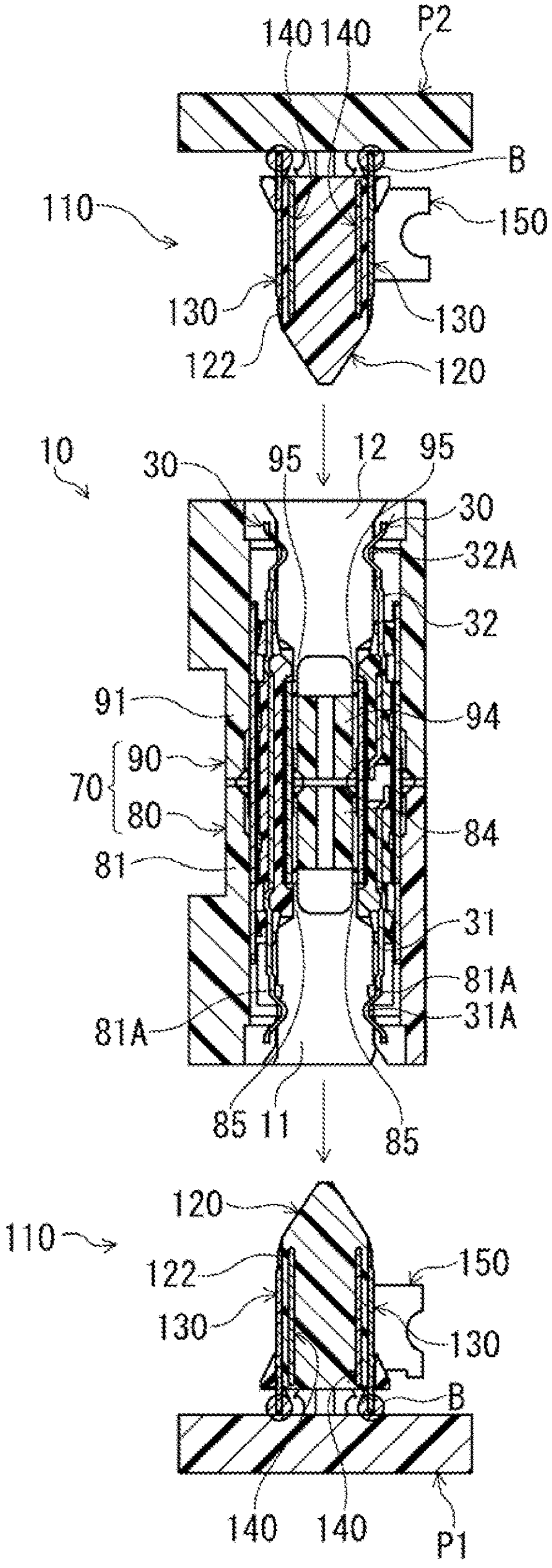
Figure 4B:
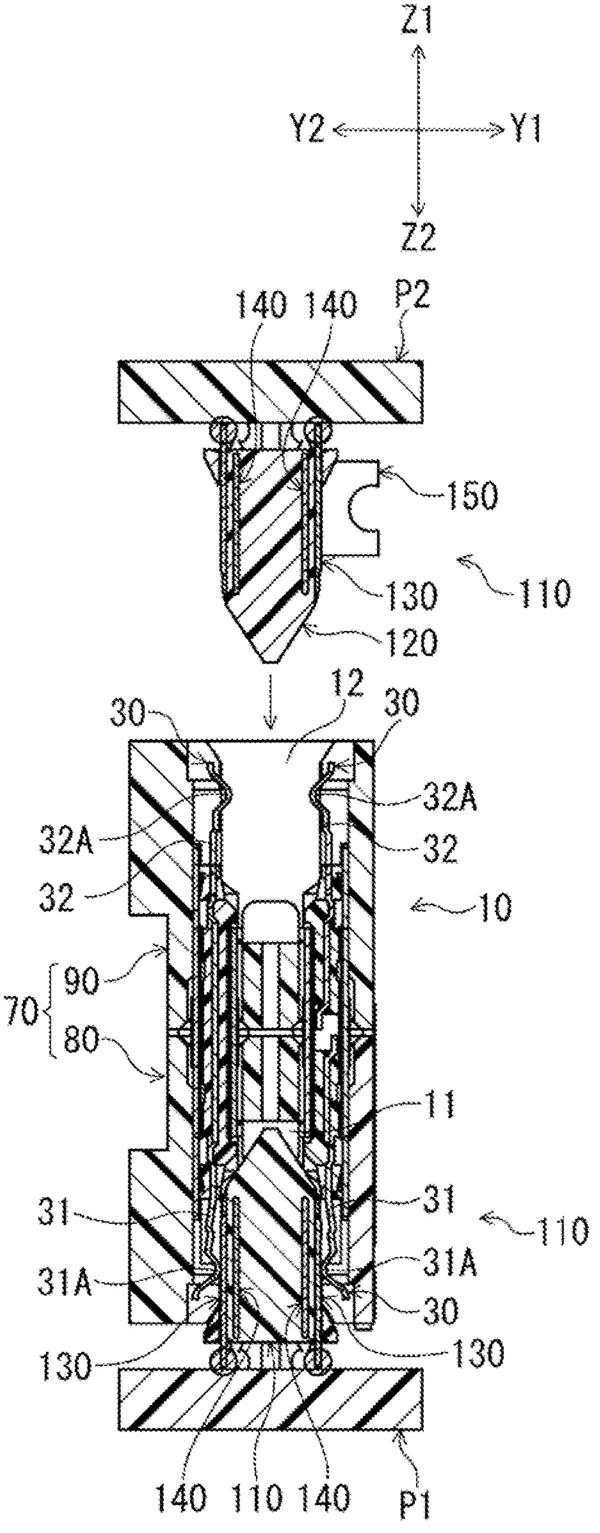

Each intermediate connecting unit 10 is formed such that two paired blades 20, which are identical in shape and are disposed facing one another in a mutually opposed relationship symmetrical in the array direction of the intermediate connecting units 10 (Y-axis direction), are received and secured in place in the hereinafter-described housing 70 (see FIGS. 4(A) and 4(B)). As shown in FIGS. 4(A) and 4(B), a space that is open downwardly between the blades 20 at the bottom of the intermediate connecting unit 10 is formed as a lower receiving portion 11 intended for receiving a connecting unit 110 of the first counterpart connector 2 from below. On the other hand, a space that is open upwardly between the blades 20 at the top of the intermediate connecting unit 10 serves as an upper receiving portion 12 intended for receiving a counterpart connecting unit 110 of the second counterpart connector 3 from above.

Figure 3B:
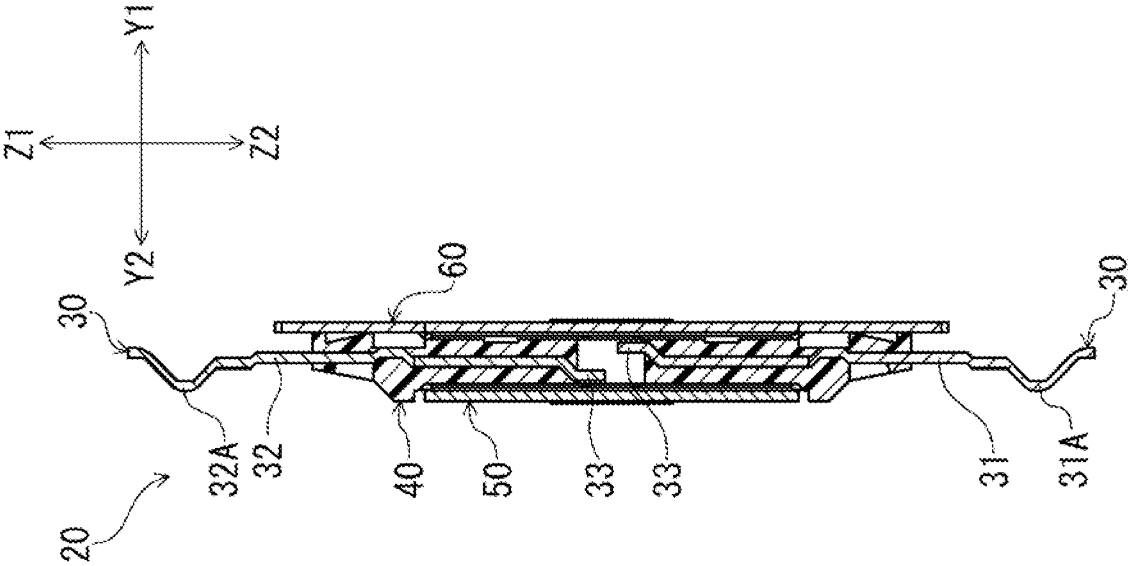
FIG. 3(B) illustrates a cross-sectional view of the blade of FIG. 3(A).
Figure 3A:
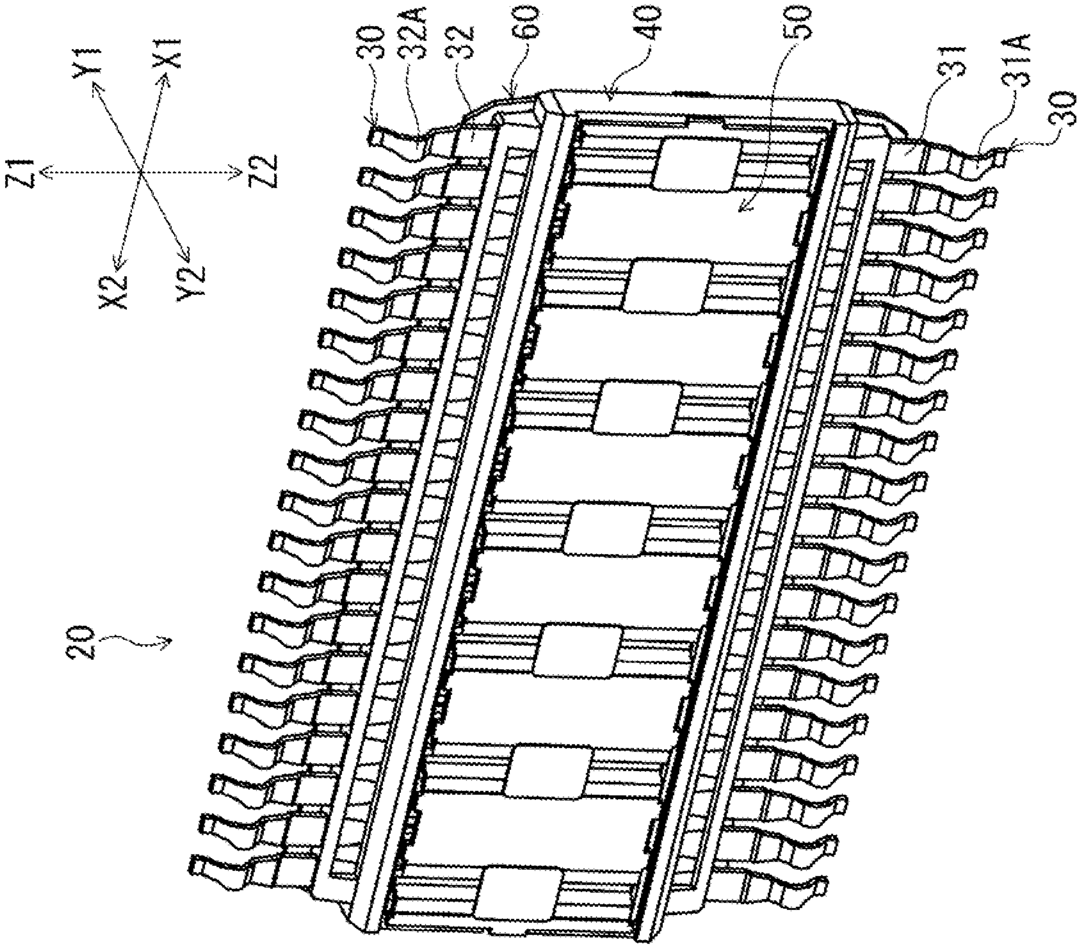
FIG. 3(A) illustrates a perspective view of a blade of the intermediate electrical connector of FIG. 1 shown in isolation.

FIG. 3(A) is a perspective view illustrating a blade 20 of the intermediate connector 1 of FIG. 1 in isolation, and FIG. 3(B), which is a cross-sectional view of the blade 20 in a plane (YZ plane) perpendicular to the connector width direction (X-axis direction), shows a cross-section taken at the location of a terminal in the connector width direction. As can be seen in FIG. 3(A), the blade 20 has multiple terminals 30 arranged in the connector width direction at equally spaced intervals, a substrate 40 of an electrically insulating material that collectively secures said multiple terminals 30 in place via unitary co-molding, an internal grounding plate 50 attached to one major side of said substrate 40 (Y2 side in FIGS. 3(A) and 3(B), which corresponds to the hereinafter-described "internal side"), and an external grounding plate 60 attached to the other major side (Y1 side in FIGS. 3(A) and 3(B), which corresponds to the hereinafter-described "external side") (see also FIG. 3(B)). Below, the mutually opposed faces of the two paired blades 20 are referred to as the "internal side", while the opposite faces thereof are referred to as the "external side".

As can be seen in FIGS. 3(A) and 3(B), the terminals 30 are made by partially bending strip-shaped metal members extending in the connector mating direction, i.e., in the up-down direction. The terminals 30 have bottom resilient arm portions 31 that project downwardly from the lower end of the substrate 40, top resilient arm portions 32 that project upwardly from the upper end of the substrate 40, and coupling portions 33 that extend in the up-down direction and couple the bottom resilient arm portions 31 and the top resilient arm portions 32 (see FIG. 3(B)).

In the present embodiment, the multiple terminals 30 secured by a single blade 20 include terminals 30 of three different shapes. FIG. 3(B) shows the terminals 30 of the first and second shapes. The terminals 30 of the first and second shapes are adjacent to each other, and the middle sections of the coupling portions 33 extend in an oblique manner so as to intersect with each other when viewed in the thickness direction of the blade 20 (Y-axis direction). Accordingly, the terminals 30 in which the bottom resilient arm portions 31 are shown at the bottom of FIG. 3(B), and the terminals 30 in which the top resilient arm portions 32 are shown at the top of the same figure, are separate terminals that are adjacent to each other (see the blade 20 located on the right (side Y1) of the two blades 20 of FIGS. 4(A) and 4(B)). In addition, terminals 30 of a third shape extend in the up-down direction without intersecting with the other terminals 30 (see the blade 20 located on the left (side Y2) of the two blades 20 of FIGS. 4(A) and 4(B)).

Both the bottom resilient arm portions 31 and the top resilient arm portions 32 are respectively enabled for resilient displacement in the through-thickness direction. As can be seen in FIGS. 3(A) and 3(B), bottom contact portions 31A and top contact portions 32A, which are bent to protrude in the through-thickness direction (Y-axis direction) toward the internal side (Y2 side), are formed on the lower end side of said bottom resilient arm portions 31 and on the upper end side of said top resilient arm portions 32, with the bottom contact portions 31A and the top contact portions 32A being respectively adapted for resilient contact with the terminals 130 of the counterpart connectors 2 and 3 (the hereinafter-described “counterpart terminals 130”).

As can be seen in FIGS. 3(A) and 3(B), the substrate 40 has a rectangular plate-like configuration that extends across a range that includes the terminal array range in the connector width direction (X-axis direction) and also extends across the range of the coupling portions 33 in the up-down direction (Z-axis direction).

As discussed before, the internal grounding plate 50 is located on the inner lateral face of the substrate 40 (major face on side Y2 in FIGS. 3(A) and 3(B)). The external grounding plate 60 is made of sheet metal and, as discussed before, is located on the outer lateral face of the substrate 40 (major face on side Y1 in FIGS. 3(A) and 3(B)). As can be seen in FIG. 3(B), the external grounding plate 60 is larger than the internal grounding plate 50 in the up-down direction. The internal grounding plate 50 and the external grounding plate 60 are secured to the substrate 40 by ultrasonic welding in surface contact with to the respective corresponding major faces of the substrate 40.

As can be seen in FIG. 1, the housing 70, which is made of an electrically insulating material (e.g., resin), has a bottom housing half 80 and a top housing half 90 split in the up-down direction. In the housing 70, the inner lateral faces of the two blades 20 are in a face-to-face relationship, with the bottom halves of both blades 20 received and held in place in the bottom housing half 80 and the top halves of both blades 20 received and held in place in the top housing half 90 (see FIGS. 4(A) and 4(B)).

As can be seen in FIG. 2, the bottom housing half 80 has two long walls 81 that extend in the connector width direction (X-axis direction), two short walls 82 that extend in the array direction of the intermediate connecting units 10 (Y-axis direction) and couple the end portions of the long walls 81, and restricting portions 83 that are coupled to said short walls 82, and as a whole has a substantially rectangular parallelepiped-like external configuration. In addition, as can be seen in FIGS. 4(A) and 4(B), a single partition 84 that extends in the connector width direction between the two long walls 81 and couples the interior wall surfaces of the two short walls 82, is formed at a central location in the array direction of the bottom housing half 80. The two spaces that are enclosed by these long walls 81, short walls 82, and the partition 84 and that form passages in the up-down direction constitute blade-receiving opening portions 85 intended to receive the respective blades 20.

The long walls 81 have raised engaging portions 81A that protrude from the interior wall surface of the long walls 81 at locations proximate to the opposite ends in the connector width direction (X-axis direction) and locations proximate to the bottom end in the up-down direction (Z-axis direction) (see FIG. 4(A)). The engaging portions 81A are located outside of the terminal array range in the connector width direction and are enabled to engage the hereinafter-described engageable portions 123A provided in the first counterpart connector 2 (see FIG. 1) in the direction of connector disengagement (upwards (Z1 direction)) in a state of mated connection to the first counterpart connector 2. In the present embodiment, the intermediate connector 1 and the first counterpart connector 2 are positioned with respect to each other in the up-down direction through the engagement of the engaging portions 81A and the engageable portions 123A.

Figures 7A, 7B:
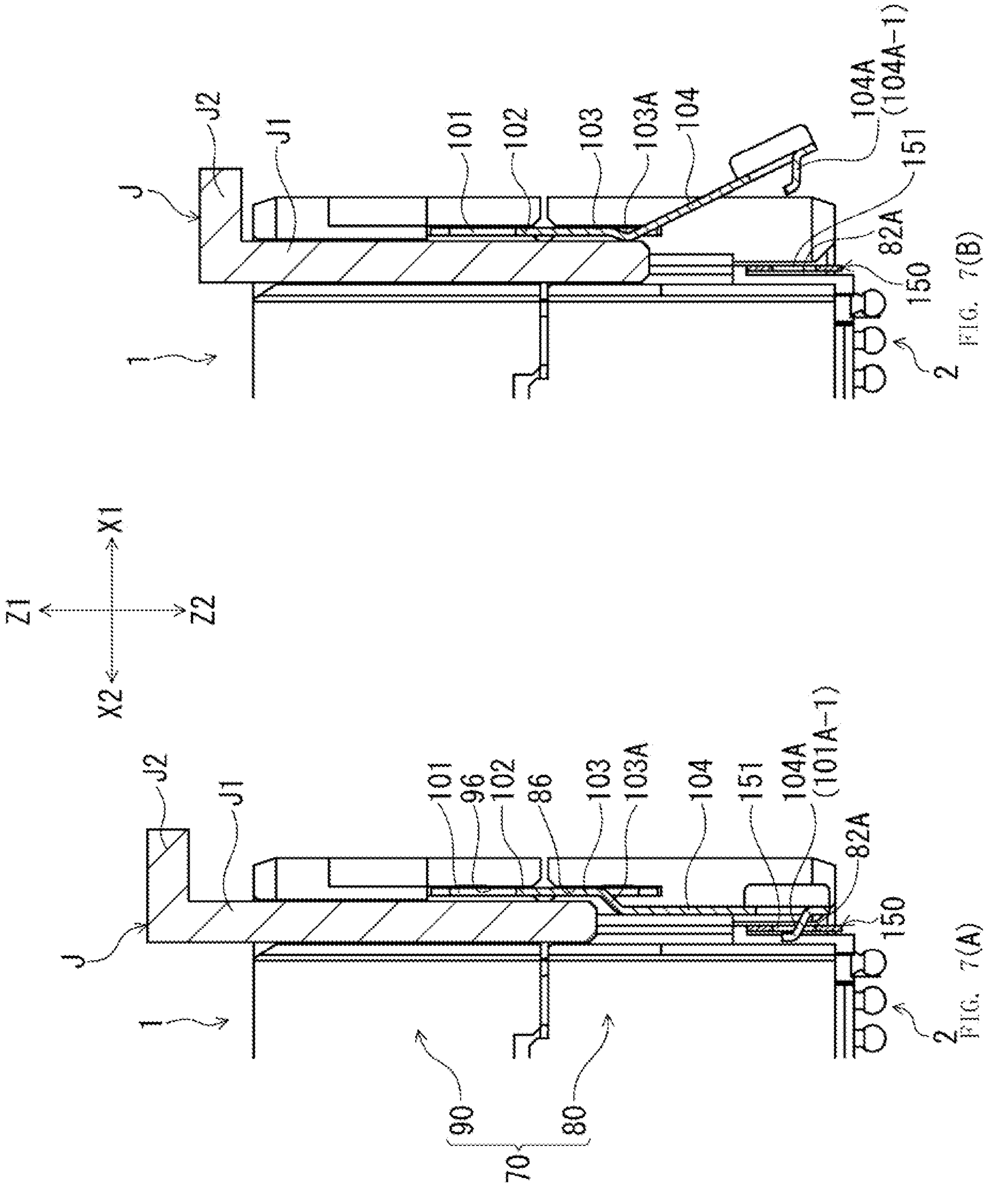

In addition, end receiving portions 82A having a downwardly open slit-like configuration are formed at the bottom of the short walls 82 at locations proximate to the opposite ends in the connector width direction (see FIGS. 7(A) and 7(B)). The end receiving portions 82A are adapted to receive the top portions of linking members 150 of the hereinafter-described first counterpart connector 2 when the connectors are in a mated state.

The restricting portions 83 extend along the exterior surface of the short walls 82 and are coupled to the bottom portions of the short walls 82. As can be seen in FIG. 2, the restricting portions 83, which have two vertical portions 83A that extend in the up-down direction and a transverse portion 83B that extends in the array direction and links the upper end portions of said two vertical portions 83A, have a generally inverted U-shaped configuration when viewed in the connector width direction. In addition, the spaces that are enclosed by the top halves of the vertical portions 93A and the transverse portion 93B and form passages in the connector width direction are formed as restricting recessed portions 83C that allow for the hereinafter-described bottom restricted pieces 101A of the coupling members 100 to be push-fitted therein. The interior wall surfaces of the restricting recessed portions 83C are formed by the opposed wall surfaces of the two vertical portions 83A (surfaces perpendicular to the array direction (Y-axis direction)) and the bottom face of the transverse portion 83B.

In addition, as can be seen in FIG. 2, end groove portions 86, which have an upwardly open slit-like configuration, are formed between the top portions of the restricting portions 83 and the top portions of the short walls 82 in the connector width direction. The end groove portions 86 are adapted to receive the bottom portions of the hereinafter-described supported plate portions 101 of the coupling members 100 from above.

With the exception of not having sections corresponding to the engaging portions 81A of the bottom housing half 80, the top housing half 90 has the same configuration as the bottom housing half 80. Therefore, in a state of mated connection to the second counterpart connector 3, the top housing half 90 does not engage said second counterpart connector 3. The top housing half 90 is assigned reference numerals obtained by adding "10" to the reference numerals of the components of the bottom housing half 80 (for example, the reference numeral "93" is assigned to the "restricting portions" of the top housing half 90, which correspond to the "restricting portions 83" of the bottom housing half 80) and is not further discussed herein.

The coupling members 100 are fabricated by punching from a sheet metal member while keeping its surface flat and, at the same time, partially bending said sheet metal member. As can be seen in FIG. 2, the coupling members 100 are formed to extend in the up-down direction (Z-axis direction) and in the array direction (Y-axis direction) of the intermediate connecting units 10. As can be seen in FIG. 2, along with extending in the array direction (Y-axis direction) across the array range of the intermediate connecting units 10, the coupling members 100 also extend in the up-down direction over a range spanning both housing halves 80, 90 and are in a face-to-face relationship with the lateral faces of the intermediate connecting units 10 (faces perpendicular to the X-axis direction). Each of the top housing haves 90 includes an upper surface 92 and a side surface 91. In this manner, the coupling members 100 cover the lateral faces of the intermediate connecting units 10, thereby obtaining excellent shielding effects. In addition, in the present embodiment, the coupling members 100 are made of plate-shaped members whose major faces are perpendicular to the connector width direction (X-axis direction), and since the dimensions in the connector width direction are substantially equal to the through-thickness dimensions of the coupling members 100, the intermediate connector 1 does not increase in size in the connector width direction.

Figure 5B:
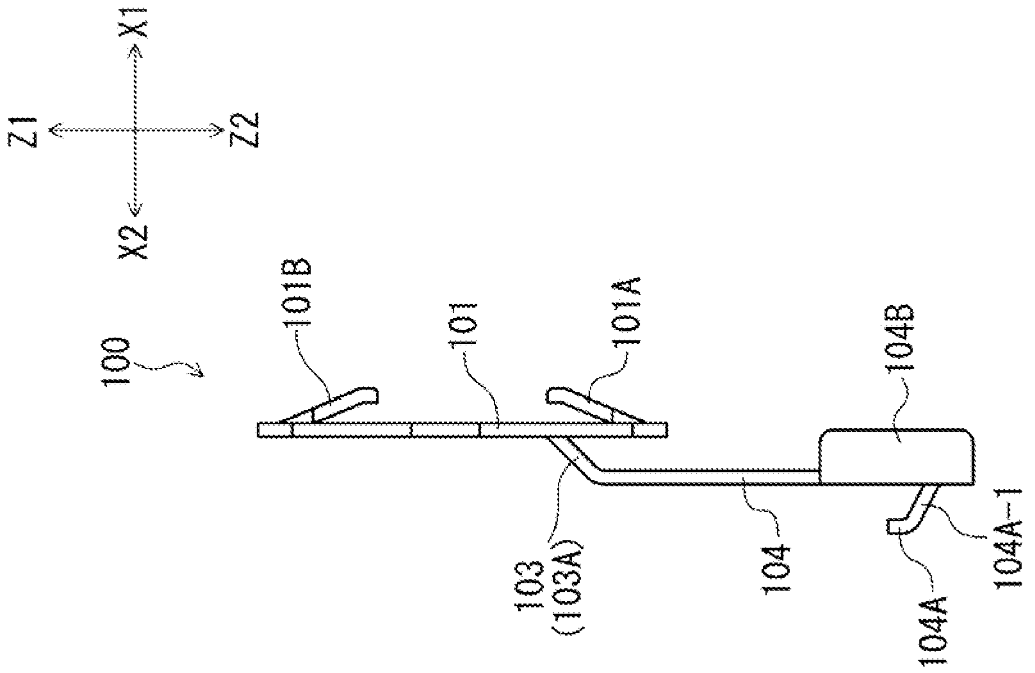
Figure 5A:
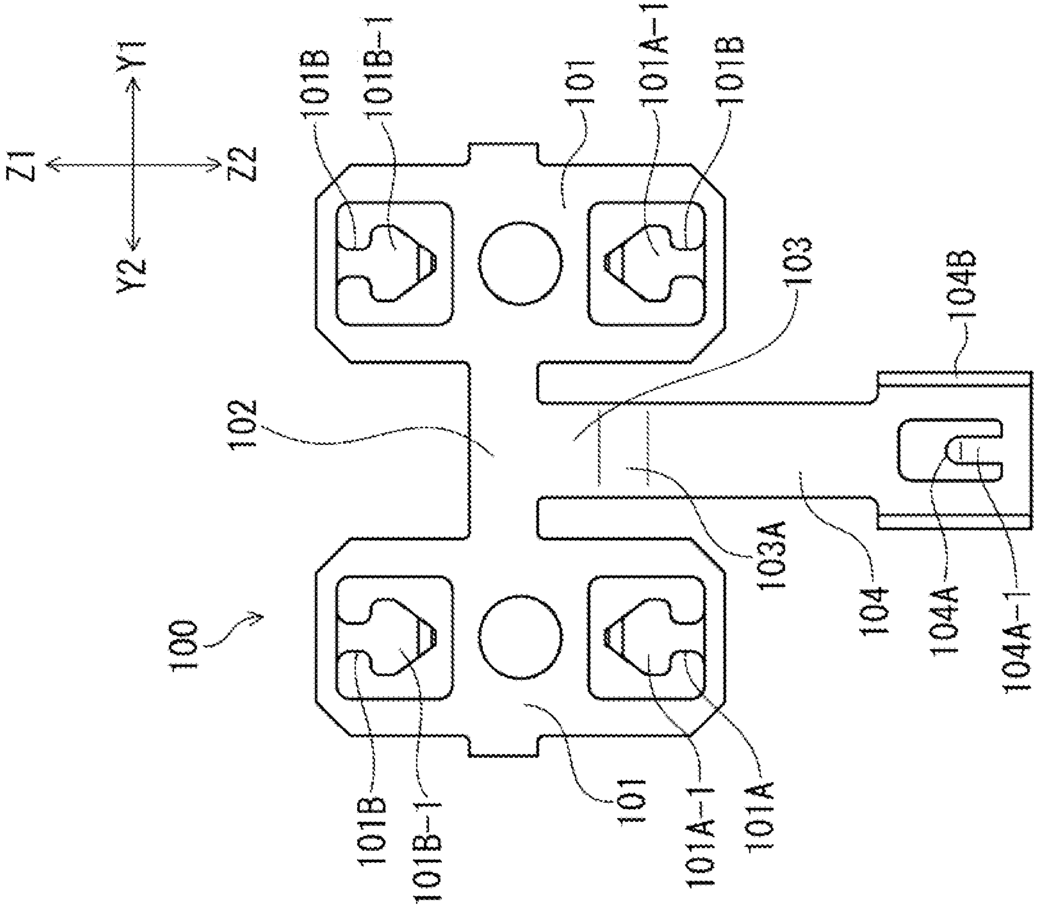

As can be seen in FIG. 2 and FIG. 5(A), the coupling members 100 have supported plate portions 101 that are supported by the two housing halves 80, 90 of said intermediate connecting units 10 at locations corresponding to each intermediate connecting unit 10 in the array direction (Y-axis direction), a coupling portion 102 that couples two supported plate portions 101 mutually adjacent in the array direction, a transitional portion 103 that extends downwardly from the coupling portion 102, and a locking leg portion 104 that extends downwardly from the bottom end of the transitional portion 103. The coupling members 100, which are enabled to engage the lockable portions 151 of the first counterpart connector 2 with the help of locking portions 104A formed in the locking leg portions 104 as described hereinbelow (see FIGS. 6(A) and 6(B)), serve as locking fittings.

The supported plate portions 101 have formed therein bottom restricted pieces 101A and upper restricted pieces 101B, which are restricted in the array direction as well as the up-down direction by the restricting portions 83, 93 of the housing halves 80, 90. Below, these pieces are collectively referred to as "restricted pieces" when there is no need to distinguish between the two. As can be seen in FIG. 2, the restricted pieces 101A, 101B, which are provided at the same locations as the restricting recessed portions 83C, 93C of the housing halves 80, 90 in the array direction, are made by cutting out and raising part of the supported plate portions 101 outwardly in the connector width direction. The restricted pieces 101A, 101B, which are formed as cantilevered strip-like pieces that extend up and down and are resiliently deformable in the connector width direction, are each shaped symmetrically in the up-down direction.

Specifically, as can be seen in FIG. 2, the bottom restricted pieces 101A extend at an incline outwardly in the connector width direction as one moves upwardly from locations proximate to the bottom end of the coupling member 100. As can be seen in FIG. 2 and FIG. 5(A), the distal end portions (top end portions) 101A-1 of the bottom restricted pieces 101A are thicker than other portions (proximal side sections) and have an upwardly tapered, rounded, substantially triangular configuration. On the other hand, the upper restricted pieces 101B extend at an incline outwardly in the connector width direction as one moves downwardly from locations proximate to the top end of the coupling member 100. As can be seen in FIG. 2 and FIG. 5(A), the distal end portions (top end portions) 101A-1 of the bottom restricted pieces 101A are made thicker than other portions (proximal side sections) and have an upwardly tapered, rounded, substantially triangular configuration.

The restricted pieces 101A, 101B are push-fitted inwardly into the restricting recessed portions 83C, 93C of the respectively corresponding housing halves 80, 90 in the connector width direction and are located within said restricting recessed portions 83C, 93C (see FIG. 1). Inside the restricting recessed portions 83C, the distal end portions 101A-1 of the bottom restricted pieces 101A are enabled to abut the opposed wall surfaces of the vertical portions 83A in the array direction (Y-axis direction) while at the same time abutting the bottom face of the transverse portion 83B from below. As a result, movement of the distal end portions 101A-1 in the array direction (Y1 direction and Y2 direction) and in the upward direction (Z1 direction) in excess of a predetermined amount is restricted. On the other hand, inside the restricting recessed portions 93C, the distal end portions 101B-1 of the upper restricted pieces 101B are enabled to abut the opposed wall surfaces of the vertical portions 93A in the array direction (Y-axis direction) while at the same time abutting the top face of the transverse portion 83B from above. As a result, movement of the distal end portions 101B-1 in the array direction (Y1 direction and Y2 direction) and in the downward direction (Z2 direction) in excess of a predetermined amount is restricted.

In the present embodiment, a slight gap (play) is formed between the distal end portions 101A-1 of the bottom restricted pieces 101A and the interior wall surfaces of the restricting recessed portions 83C (opposed wall surfaces of the vertical portions 83A and the bottom face of the transverse portion 83B). In addition, a slight gap (play) is formed between the distal end portions 101B-1 of the upper restricted pieces 101B and the interior wall surfaces of the restricting recessed portions 93C (opposed wall surfaces of the vertical portions 93A and the top face of the transverse portion 83B). Consequently, the housing halves 80, 90 are enabled for relative movement within the bounds of the gap in the array direction (Y-axis direction) and in the up-down direction (Z-axis direction). As a result, even if the locations of the two counterpart connectors 2, 3 shift, it is still possible to connect the two counterpart connectors 2, 3 to the intermediate connector 1 thanks to the relative movement, i.e., floating, of the housing halves 80, 90 of the intermediate connector 1.

The coupling portion 102 extends in the array direction and couples the supported plate portions 101 at a vertically intermediate location therebetween. The top half of the transitional portion 103 extends straight in the up-down direction, and the bottom half extends inwardly at an incline in the connector width direction as one moves downwardly. As described hereinafter, this bottom half constitutes a pressure-bearing portion 103A subject to a pushing force intended for unlocking when the intermediate connector 1 is removed from the first counterpart connector 2 (see FIGS. 7(A) and 7(B)). The pressure-bearing portion 103A is located inwardly of the supported plate portions 101 and the coupling portion 102 in the connector width direction (X-axis direction) (on side X2 in FIG. 5(B) and FIG. 7(A)).

The locking leg portion 104 extends downwardly from the bottom edge of the pressure-receiving portion 103A of the transitional portion 103. The locking leg portion 104 is thus located inwardly (on side X1) of the supported plate portions 101 and the coupling portion 102 in the connector width direction (see FIG. 5(B) and FIG. 7(A)). A locking portion 104A engageable with the hereinafter-described lockable portion 151 of the first counterpart connector 2 is formed in the bottom end portion of the locking leg portion 104. The locking portion 104A is formed as a cantilevered locking piece that is obtained by cutting out and raising part of the bottom end portion and that extends upwards. As can be seen in FIG. 5(B), the locking portion 104A extends at an incline inwardly in the connector width direction (side X2 in FIG. 5(B)) as one moves upwardly and also extends upwardly without an incline in the top end portion, and is enabled for resilient displacement in the connector width direction. In addition, the bottom end portion of the locking leg portion 104 is bent outwardly (side X1 in FIG. 5(B)) in the connector width direction at the opposite side edges (edges extending in the up-down direction) of said bottom end portion, thereby forming side pieces 104B.

The intermediate connector 1 according to the present embodiment is manufactured in the following manner. First, the manufacturing steps required to make the blades 20 will be described. First, the rows of the multiple terminals 30 provided on a single blade 20 and the substrate 40 are integrally co-molded by placing the terminal rows into a mold (not shown) used for molding the substrate 40 and then pouring molten electrically insulating material (e.g., resin) into said mold and allowing it to solidify. Next, the assembly of the blade 20 is completed by ultrasonically welding grounding plates to the substrate 40, that is, to the two major faces of the substrate 40, by attaching an internal grounding plate 50 to the inner lateral face (major face on side Y2 in FIGS. 3(A) and 3(B)) and an external grounding plate 60 to the outer lateral face (major face on side Y1 in FIGS. 3(A) and 3(B)).

The assembly of the intermediate connector 1 will be described next. First, with the inner lateral faces of two blades 20 held in a face-to-face relationship to each other, the bottom halves of the respective blades 20 are received in blade-receiving opening portions 85 provided in a bottom housing half 80 from above. Further, multiple bottom housing halves 80 having accommodated therein two blades 20 in such a manner are arranged in the thickness direction of said blades 20 (Y-axis direction).

Next, the bottom portions of the supported plate portions 101 of the coupling members 100 are inserted into end groove portions 86 provided in the bottom housing halves 80 from above. At such time, the bottom portions of the supported plate portions 101 are inserted until the bottom restricted pieces 101A abut the top end portions of restricting portions 83 provided in the bottom housing halves 80, and this state is maintained.

Next, top housing halves 90, which are held in an orientation vertically flipped with respect to the bottom housing halves 80, are aligned with the corresponding blades 20 from above and the top halves of the blades 20 are received in blade-receiving opening portions 95 provided in the top housing halves 90 from below. In addition, at the same time, the top portions of the supported plate portions 101 are inserted into end groove portions 96 provided in the top housing halves 90 from below. At such time, the top portions of the supported plate portions 101 are inserted until the upper restricted pieces 101B abut the bottom end portions of restricting portions 93 provided in the top housing halves 90, and this state is maintained.

Next, the top housing halves 90 are press-fitted from above while the bottom housing halves 80 are press-fitted from below, thereby mounting the top housing halves 90 and the bottom housing halves 80 respectively onto the corresponding blades 20. The top portions of the supported plate portions 101 are inserted into the end groove portions 96 by press-fitting the top housing halves 90 from above and, in the process of insertion, the upper restricted pieces 101B of the coupling members 100 are subject to a pushing force oriented inwardly in the connector width direction from the restricting portions 93 of the top housing halves 90. As a result, said upper restricted pieces 101B undergo resilient deformation in the same direction, thereby permitting further insertion of the top portions of the supported plate portions 101. Furthermore, once the upper restricted pieces 101B pass the locations of the transverse portions 93B of the restricting portions 93 and reach the locations of the restricting recessed portions 93C, the upper restricted pieces 101B are released from the pressure exerted by the restricting portions 93 and, as the amount of resilient deformation is decreased, return to a free state in which they are located inside the restricting recessed portions 93C.

As discussed before, when located inside the restricting recessed portions 93C, the upper restricted pieces 101B are enabled to abut the interior wall surfaces of the restricting recessed portions 93C in the array direction as well as in the up-down direction, and movement of the upper restricted pieces 101B in the same directions in excess of a predetermined amount is restricted. At such time, inadvertent detachment of the top housing halves 90 is prevented due to the fact that the upper restricted pieces 101B are enabled to engage the top face of the transverse portion 93B.

In the same manner as previously discussed with respect to the upper restricted pieces 101B, the bottom restricted pieces 101A are introduced into the restricting recessed portions 83C of the bottom housing halves 80 by press-fitting the bottom housing halves 80 from below. As a result, the bottom restricted pieces 101A are enabled to engage the interior wall surfaces of the restricting recessed portions 83C in the array direction as well as in the up-down direction, and movement of the bottom restricted pieces 101A in the same directions in excess of a predetermined amount is restricted. At such time, inadvertent detachment of the bottom housing halves 80 is prevented due to the fact that the bottom restricted pieces 101A are enabled to engage the bottom face of the transverse portion 83B. Mounting the housing halves 80, 90 in this manner completes the assembly of the intermediate connector 1.

The configuration of the counterpart connectors 2, 3 will be described next. Since the counterpart connectors 3 and 2 have exactly the same configuration, the description below will focus on the configuration of the first counterpart connector 2, and a description of the second counterpart connector 3, which will be assigned the same reference numerals as the first counterpart connector 2, will be omitted. In the present embodiment, the first counterpart connector 2 is formed by arranging counterpart connecting units

110, whose number is equal to that of the intermediate connecting units 10, at equally spaced intervals in the same direction (Y-axis direction) as the array direction of the intermediate connecting units 10, and linking them with the hereinafter-described linking members 150.

As can be seen in FIG. 1, the counterpart connecting units 110 have a housing 120 of an electrically insulating material that extends longitudinally in the connector width direction (X-axis direction), multiple terminals 130 (referred to as "counterpart terminals 130" below) held in array form in the connector width direction by the housing 120, and counterpart grounding plates 140 (see FIGS. 4(A) and 4(B))) held in the housing 120.

As can be seen in FIG. 1, the housing 120, which extends longitudinally in the connector width direction (X-axis direction), is formed to have substantially the same dimensions as the intermediate connecting units 10 of the intermediate connector 1 in the same direction. The housing 120 has multiple terminal receiving portions 122 arranged at regular intervals in the connector width direction on the two wall surfaces 121 (surfaces perpendicular to the Y-axis direction) extending in the connector width direction. The terminal receiving portions 122, which have a groove-shaped configuration that is obtained by recessing the wall surfaces and that extend in the up-down direction, are adapted to receive and hold the counterpart terminals 130.

In addition, as can be seen in FIG. 1, engageable groove portions 123, which are recessed into the wall surface 121 and extend in the up-down direction, are formed at locations proximate to the opposite ends of the housing 120 in the connector width direction, that is, on the opposite external sides of the terminal array range. The engageable groove portions 123 extend from locations proximate to the top end of the wall surface 121 to the bottom end, and open downwards. The top edge portions of the engageable groove portions 123 serve as engageable portions 123A engageable with the engaging portions 81A of the intermediate connector 1.

As can be seen in FIG. 1, the counterpart terminals 130, which are made by punching a sheet metal member in the through-thickness direction and have a generally strip-like configuration extending in the up-down direction, are secured in place in the terminal receiving portions 122 of the housing 120 by press-fitting from below and are arranged in the connector width direction. On the upper end side, said counterpart terminals 130 have contact portions for contact with the bottom contact portions 31A of the terminals 30 of the intermediate connector 1, while on the lower end side have connecting portions for solder connection to the corresponding circuitry (not shown) on a circuit board. Said connecting portions protrude from the bottom face of the housing 120 and, as shown in FIG. 1, solder balls B are attached to said connecting portions (see also FIGS. 6(A) and 6(B)).

The counterpart grounding plates 140, which are made of sheet metal and have major faces perpendicular to the thickness direction of the housing 120 (Y-axis direction), extend over substantially the entire extent of the second counterpart connector 3. As can be seen in FIGS. 4(A) and 4(B), in the present embodiment, the two counterpart grounding plates 140, which are provided in a face-to-face relationship at intermediate locations in the thickness direction of the housing 120, are secured in place by embedding in the housing 120 via unitary co-molding.

The linking members 150, whose major faces are perpendicular to the connector width direction (X-axis direction), extend over the full extent of the array range of the first counterpart connector 2 in the array direction (Y-axis direction) of the first counterpart connector 2. The linking members 150, which are located such that their major faces are in a closely spaced face-to-face relationship with faces on the opposite sides of the second counterpart connector 3 in the connector width direction (faces perpendicular to the X-axis direction), are coupled to the grounding plates 140 with the help of the top edges of said linking members 150.

The linking members 150 have circular hole-shaped lockable portions 151 formed through the linking members 150 in their through-thickness direction at locations between counterpart connecting units 110 mutually adjacent in the array direction, i.e., at locations corresponding to the locking portions 104A of the coupling members 100 of the intermediate connector 1 in the array direction. As described hereinafter, in a state of mated connection to the intermediate connector 1, the lockable portions 151 are enabled to receive the locking portions 104A of the intermediate connector 1 and, at the same time, engage said locking portions 104A from above. In other words, the linking members 150 equipped with the lockable portions 151 serve as lockable fittings.

The second counterpart connector 3 has the same configuration as the previously described first counterpart connector 2. However, due to the fact that no engaging portions 81A or locking portions 104A are provided on the top side of the intermediate connector 1, i.e., on the side corresponding to the second counterpart connector 3, the sections corresponding to the engageable portions 123A of the first counterpart connector 2 and the sections corresponding to the lockable portions 151 in the second counterpart connector 3 serve no particular purpose.

The operation of mating of the intermediate connector 1 and the counterpart connectors 2, 3 will be described next. First, the multiple counterpart connectors 2, 3 are mounted to the respectively corresponding the circuit boards P1, P2 using solder connections. Next, the first counterpart connector 2 is held in an orientation in which the contact portions of the counterpart terminals 130 are located at the top (orientation illustrated in FIG. 1 and FIG. 4(A)) and said intermediate connector 1 is positioned above the first counterpart connector 2 such that the bottom receiving portions 11 (see FIG. 4(A)) of the intermediate connecting units 10 of the intermediate connector 1 are aligned with the respectively corresponding counterpart connecting units 110.

Next, the intermediate connector 1 is lowered (see arrows in FIG. 1 and FIG. 4(A)) and the intermediate connecting units 10 are mated with the respectively corresponding counterpart connecting units 110 from above. When the mating of the intermediate connector 1 with the second counterpart connector 3 is complete, the bottom contact portions 31A of the terminals 30 provided on the blades 20 of the intermediate connecting units 10 are contacted under contact pressure, and thus placed in electrical communication, with the contact portions of the counterpart terminals 130 provided in the first counterpart connector 2.

In addition, during the operation of mating of the intermediate connector 1 and the second counterpart connector 3, the bottom faces of the inclined portions 104A-1 of the locking portions 104A of the intermediate connector 1 abut the top ends of the linking members 150 of the first counterpart connector 2 from above. Due to being inclined upwardly as one moves inwardly in the connector width direction, upon abutting the top ends of the linking members 150, the inclined portions 104A-1 of the locking portions 104A are acted upon by a reaction force exerted by said linking members 150. This reaction force generates component forces acting in two directions, i.e., upwards (Z1 direction) and outwardly in the connector width direction (X1 direction in FIG. 5(B)). As the inclined portions 104A-1 are acted upon by the component force acting outwardly in the connector width direction, the locking portions 104A are resiliently displaced in the same direction, thereby permitting the descent of the intermediate connector 1.

When the free end portions of the locking portions 104A reach the location of the hole-shaped lockable portions 151 of the linking members 150, the locking portions 104A return to the free condition, and the sections proximate to the free end portions enter the lockable portions 151 in the connector width direction. As a result, as can be seen in FIG. 6(A), the inclined portions 104A-1 of the locking portions 104A are positioned in a manner permitting engagement with the top edges of the lockable portions 151 from below (see also FIG. 7(A)), which, as described below, makes it possible to prevent inadvertent decoupling of the intermediate connector 1 from the first counterpart connector 2. At such time, the inclined portions 104A-1 are positioned such that there is a gap with respect to the top edges of the lockable portions 151 in the up-down direction (see FIG. 6(A) and FIG. 7(A)).

In addition, when the intermediate connector 1 and the first counterpart connector 2 are matingly connected, the engaging portions 81A of the bottom housing half 80 of the intermediate connector 1 engage the engageable portions 123A of the housing 120 of the first counterpart connector 2 in the direction of disengagement of the intermediate connector 1 (upwards), thereby positioning the intermediate connector 1 and the first counterpart connector 2 with respect to each other in the up-down direction. In the present embodiment, the engaging portions 81A and the engageable portions 123A are engaged in the up-down direction without a gap therebetween.

Next, the second counterpart connector 3, which is held in an orientation vertically inverted with respect to the first counterpart connector 2 (in the orientation shown in FIG. 1), is matingly connected to the intermediate connector 1 from above (see arrow in FIG. 1). The procedure used for matingly connecting said second counterpart connector 3 is identical to the previously discussed procedure used for the first counterpart connector 2. However, due to the fact that there are no engaging portions 81A or locking portions 104A provided on the top side of the intermediate connector 1, matingly connecting the intermediate connector 1 and the second counterpart connector 3 does not produce the state of engagement (state of engagement between the engaging portions 81A and the engageable portions 123A) or the locked state (the locked state of the locking portions 104A and the lockable portions 151) described previously in connection with the intermediate connector 1 and the first counterpart connector 2.

As a result of matingly connecting the counterpart connectors 2, 3 and the intermediate connector 1 in this manner, the two counterpart connectors 2, 3 are electrically connected through the medium of the intermediate connector 1.

As discussed before, in the present embodiment, when the intermediate connector 1 and the first counterpart connector 2 are matingly connected, the locking portions 104A and the lockable portions 151 are positioned such that there is a predetermined gap with respect to the top edges of the lockable portions 151 in the up-down direction, as can be seen in FIG. 6(A) and FIG. 7(A).

Figure 6B:
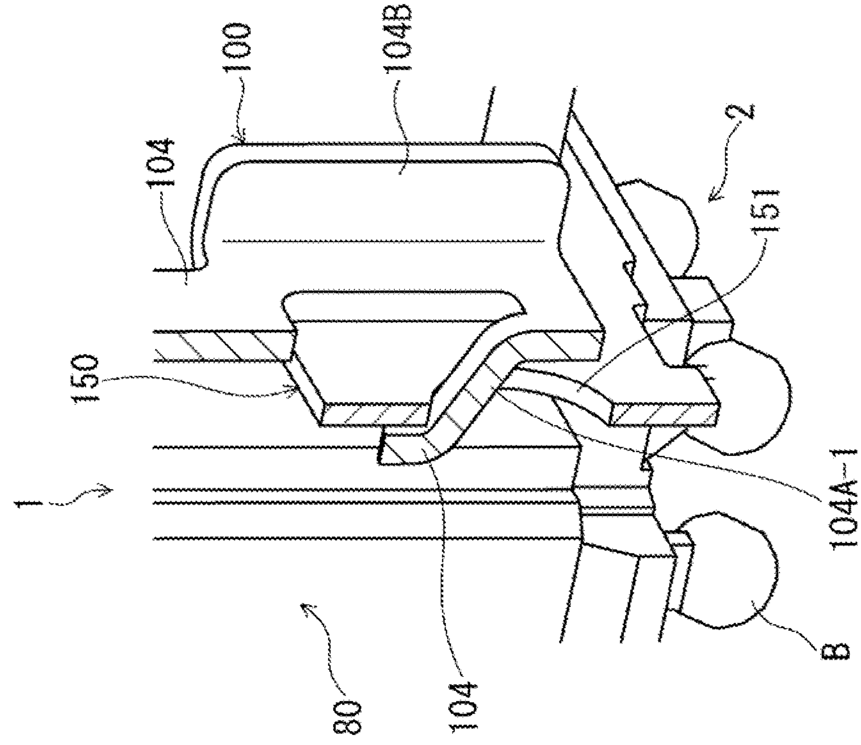
Figure 6A:
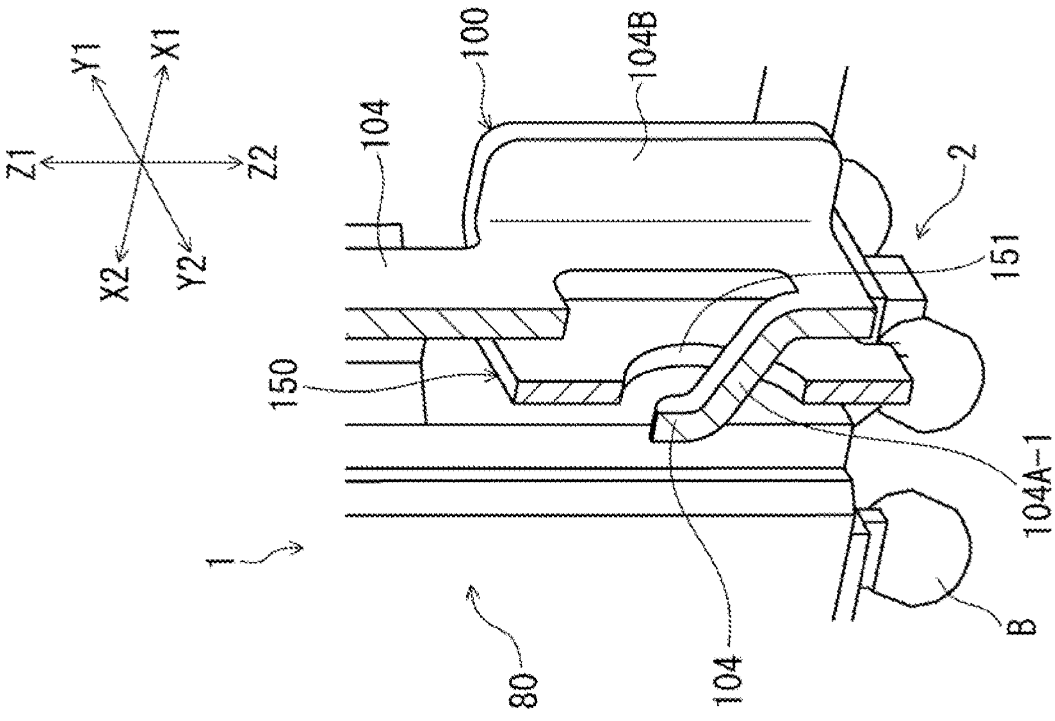

If a force (disengaging force) directed in the direction of disengagement (upwardly) acts on the intermediate connector 1, the intermediate connector 1 moves in the same direction in exact proportion to the dimensions of the gap, and, as can be seen in FIG. 6(B), the inclined portions 104A-1 of the locking portions 104A abuttingly engage the top edges of the lockable portions 151. As a result, further movement of the intermediate connector 1 is restricted, and its decoupling from the first counterpart connector 2 is prevented.

As discussed before, when the second counterpart connector 3 is matingly connected to the intermediate connector 1 after matingly connecting the intermediate connector 1 and the first counterpart connector 2, the mating operation may be performed while holding both connectors in an oblique orientation with respect to the up-down direction (vertical direction). In the present embodiment, during such a mating operation, the intermediate connector 1 assumes an oblique orientation and a disengaging force due to its own weight acts on the intermediate connector 1. As a result, the force of engagement between the engaging portions 81A of the intermediate connector 1 and the engageable portions 123A of the first counterpart connector 2 counteracts the disengaging force, but if said disengaging force is greater than said engagement force, the engaging portions 81A become detached from the engageable portions 123A. However, in the present embodiment, the decoupling of the intermediate connector 1 is nonetheless adequately prevented even in such a case because the inclined portions 104A-1 of the locking portions 104A are engaged with the lockable portions 151.

In addition, in the present embodiment, the locking portions 104A are formed as part of the coupling members 100, which are metallic members, and the lockable portions 151 are formed as part of the linking members 150, which are metallic members. Therefore, the strength of the locking portions 104A and that of the lockable portions 151 is respectively increased, and an adequate force of engagement, i.e., locking strength, is ensured between the locking portions 104A and the lockable portions 151. As a result, the effect of preventing the decoupling of the intermediate connector 1 is enhanced.

Although in the present embodiment both the locking portions 104A and the lockable portions 151 are made of metal, as long as adequate locking strength can be ensured, the lockable portions, for example, may be formed in the housing of the first counterpart connector and the metal locking portions of the intermediate connector 1 may be adapted to engage these lockable portions.

The operation of connector removal will be described next. First, the second counterpart connector 3 is pulled upwards and removed from the intermediate connector 1. The second counterpart connector 3 is disengaged without difficulty because no engagement forces or locking forces whatsoever act between the second counterpart connector 3 and the intermediate connector 1.

Next, the intermediate connector 1 is removed from the first counterpart connector 2 in accordance with the following procedure. In the present embodiment, the two matingly connected connectors are in a locked state created by the locking portions 104A and the lockable portions 151 as described above. Therefore, the intermediate connector 1 will not become disengaged even if an attempt is made to withdraw the intermediate connector 1 by pulling it upwards using a disengaging force that is larger than the force of engagement between the engaging portions 81A and the engageable portions 123A. Accordingly, in the present embodiment, the intermediate connector 1 is removed using a jig J, such as the one shown in FIGS. 7(A) and 7(B).

As can be seen in FIGS. 7(A) and 7(B), the jig J, which is made by bending a sheet metal member in the through-thickness direction, has an insert portion J1, which has major faces perpendicular to the connector width direction and extends in the up-down direction, and an operative portion J2, which is bent at a right angle at the top end of the insertion portion J1, extends in the connector width direction, and is subject to the hereinafter-described pressing operation. Although in the present embodiment the jig J is made of metal, the material is not limited thereto, and, for example, the jig can be made from plastic.

In the up-down direction (Z-axis direction), the insertion portion J1 has dimensions corresponding to a range extending from the top end of the housing 70 of the intermediate connector 1 to the transitional portion 103 of the coupling member 100 (see FIG. 7(B)), and, in the array direction of the intermediate connecting units 10 (Y-axis direction), has dimensions that are slightly larger than locking portion 104A of the coupling member 100.

As can be seen in FIG. 7(A), when the intermediate connector 1 is removed, the insertion portion J1 of the jig J is inserted from above into a gap extending in the up-down direction between the lateral end face of a blade 20 and the interior wall surface of the housing 70 opposed to this lateral end face in the connector width direction (X-axis direction). In this manner, the bottom end portion of the inserted insertion portion J1 abuts the pressure-receiving portion 103A of the transitional portion 103 of the coupling member 100 from above.

Next, a pressing operation is performed by applying pressure to the operative portion J2 of the jig J from above. As a result, the bottom end portion of the insertion portion J1 applies pressure from above to the pressure-receiving portion 103A of the transitional portion 103. Since in the present embodiment the pressure-receiving portion 103A is inclined inwardly in the connector width direction as one moves downwardly (see FIG. 7(A)), when the bottom end portion of the insertion portion J1 applies pressure to the pressure-receiving portion 103A, a component force directed downwardly and a component force directed outwardly in the connector width direction act on the pressure-receiving portion 103A. As can be seen in FIG. 7(B), the pressure-receiving portion 103A is acted upon by the component force directed outwardly in the connector width direction, as a result of which the locking leg portion 104 is displaced outwardly in the connector width direction about the top end location of the pressure-receiving portion 103A as a fulcrum. As a result, the locking portion 104A moves outwardly in the connector width direction and is detached from the moving lockable portion 151, and the lockable state (engageable state) of the locking portion 104A and the lockable portion 151 is disengaged. The intermediate connector 1 is disengaged from the first counterpart connector 2 without difficulty by pulling the intermediate connector 1 upwardly using a disengaging force larger than the force of engagement between the engaging portions 81A and the engageable portions 123A while maintaining this unlocked state.

Although in the present embodiment the blades 20 of the intermediate connector 1, which have terminals 30 arranged thereon, are secured in place in the housing 70, as a result of which said housing 70 indirectly secures the terminals 30 in place, the way the terminals 30 are secured in place is not limited thereto, and the housing may be adapted to secure the terminals in place directly without providing blades.

Although in the present embodiment the first and second counterpart connect bodies are electrical connectors, the configuration of the counterpart connect bodies is not limited thereto and, for example, at least one of the first and second counterpart connect bodies may be formed as a circuit board connected to the intermediate electrical connector. In addition, if the counterpart connect bodies are electrical connectors, the electrical connectors do not necessarily have to be electrical connectors for circuit boards such as the ones used in the present embodiment and, for example, at least one of the first and second counterpart connect bodies may be formed as an electrical connector for cables that is connected to a cable.

Although the present embodiment provides two intermediate connecting units 10 in the intermediate connector 1 and two counterpart connecting units 110 in the counterpart connectors 2, 3, the number of the various connecting units is not limited thereto and may be three or more units. If the number of the various connecting units is three or more, the locking leg portions of the coupling members provided in the intermediate connector will be provided at locations between mutually adjacent intermediate connecting units (referred to as "locations between adjacent units" below) in the array direction of the intermediate connecting units, but it is not essential for the locking leg portions to be provided at all the locations between adjacent units and a locking leg portion may be provided at one location between adjacent units.

DESCRIPTION OF THE REFERENCE NUMERALS

1 Intermediate connector
2 First counterpart connector (first counterpart connect body)
3 Second counterpart connector (second counterpart connect body)
10 Intermediate connecting unit
30 Terminal
70 Housing
80 Bottom housing half
81A Engaging portion
90 Top housing half
100 Coupling member (locking fitting)
104A Locking portion
123A Engageable portion
150 Linking member (lockable fitting)
151 Lockable portion
P1, P2 Circuit boards

The invention claimed is:

1. An intermediate electrical connector which, upon connection of a first counterpart connect body and a second counterpart connect body each from different sides in a manner permitting plugging and unplugging, mediates between the first and second counterpart connect bodies, and which comprises:

terminals that are enabled to contact, respectively, the first counterpart connect body and the second counterpart connect body;

a housing that directly or indirectly secures the terminals in place; and locking fittings supported by the housing of the intermediate electrical connector, the locking fittings comprising locking portions enabled to engage lockable portions provided in the first counterpart connect body in a direction of disengagement when the intermediate electrical connector and the first counterpart connect body are connected, wherein the housing comprises an upper housing and a lower housing coupled by the locking fittings, and wherein a part of the locking fittings that retains the upper housing and the lower housing extends to a location of the first counterpart connect body to lock the intermediate electrical connector into the first counterpart connect body.

2. The intermediate electrical connector according to claim 1, wherein the locking fittings have plate-shaped sections extending in a direction of plugging into, and unplugging from, the first counterpart connect body, wherein locking portions are formed as cantilevered resiliently displaceable locking pieces that are obtained by cutting out and raising a portion of the plate-shaped sections and that extend in the direction of disengagement from the first counterpart connect body, and wherein the locking pieces are enabled to engage the lockable portions of the first counterpart connect body.

3. The intermediate electrical connector according to claim 1, wherein the housing comprises engaging portions enabled to engage engageable portions provided in the first counterpart connect body in the direction of disengagement when the intermediate electrical connector and said first counterpart connect body are connected.

4. The intermediate electrical connector according claim 1, wherein the housing has two housing halves split including the upper housing and the lower housing in a direction of connection to the first connect body, wherein the locking fittings extend in the direction of connection within a range spanning the two housing halves and are supported by said two housing halves, and wherein the two housing halves are enabled for relative movement within a predetermined range in a direction perpendicular to the direction of connection.

5. The intermediate electrical connector according to claim 1, wherein the intermediate electrical connector comprises a plurality of connecting units having the terminals and the housings, wherein the plurality of connecting units are arranged such that an array direction is a direction perpendicular to a direction of connection to the first connect body, and wherein the locking fittings extend throughout an array range of the plurality of connecting units in the array direction and collectively couple said plurality of connecting units.

6. An electrical connector assembly, comprising:

an intermediate electrical connector which, upon connection of a first counterpart connect body and a second counterpart connect body each from different sides in a manner permitting plugging and unplugging, mediates between the first and second counterpart connect bodies, and which comprises:

terminals that are enabled to contact, respectively, the first counterpart connect body and the second counterpart connect body;

a housing that directly or indirectly secures the terminals in place; and locking fittings supported by the housing of the intermediate electrical connector, the locking fittings comprising locking portions enabled to engage lockable portions provided in said first counterpart connect body in a direction of disengagement when the intermediate electrical connector and the first counterpart connect body are connected, wherein the housing comprises an upper housing and a lower housing coupled by the locking fittings, and wherein a part of the locking fittings that retains the upper housing and the lower housing extends to a location of the first counterpart connect body to lock the intermediate electrical connector into the first counterpart connect body.

7. The electrical connector assembly according to claim 6, wherein the first counterpart connect body is a counterpart connector that is matingly connected to the intermediate electrical connector and has lockable fittings having formed therein lockable portions enabled to engage the locking portions of the intermediate electrical connector upon connection to said intermediate electrical connector.

8. The electrical connector assembly of claim 6, further comprising a circuit board, wherein the first counterpart connect body of the electrical connector assembly is an electrical connector for circuit boards that is mounted to the circuit board and is matingly connectable to the intermediate electrical connector.

9. The intermediate electrical connector according to claim 1, wherein the intermediate electrical connector comprises a plurality of connecting units having the terminals and the housings.

10. The intermediate electrical connector according to claim 9, wherein the plurality of connecting units are arranged such that an array direction is a direction perpendicular to a direction of connection to the first connect body.

11. The intermediate electrical connector according to claim 9, wherein the locking fittings extend throughout an array range of the plurality of connecting units and collectively couple the plurality of connecting units.

12. An intermediate electrical connector which, upon connection of a first counterpart connect body and a second counterpart connect body each from different sides in a manner permitting plugging and unplugging, mediates between the first and second counterpart connect bodies, and which comprises:

terminals that are enabled to contact, respectively, the first counterpart connect body and the second counterpart connect body;

a housing that directly or indirectly secures the terminals in place; and locking fittings supported by the housing of the intermediate electrical connector, the locking fittings comprising locking portions enabled to engage lockable portions provided in the first counterpart connect body in a direction of disengagement when the intermediate electrical connector and the first counterpart connect body are connected, wherein the intermediate electrical connector comprises a plurality of connecting units having the terminals and the housings, wherein the plurality of connecting units are arranged such that an array direction is a direction perpendicular to a direction of connection to the first connect body, and wherein the locking fittings extend throughout an array range of the plurality of connecting units in the array direction and collectively couple said plurality of connecting units.

* * * * *